United States Patent [19]

Takahashi

[11] Patent Number: 4,727,842
[45] Date of Patent: Mar. 1, 1988

[54] ENGINE IGNITION TIMING CONTROL APPARATUS

[75] Inventor: Nobutaka Takahashi, Yokosuka, Japan

[73] Assignee: Nissan Motor Company, Limited, Kanagawa, Japan

[21] Appl. No.: 943,806

[22] Filed: Dec. 19, 1986

[30] Foreign Application Priority Data

Dec. 20, 1985 [JP] Japan .............................. 60-285812

[51] Int. Cl.$^4$ .............................................. F02P 5/14
[52] U.S. Cl. .................................................. 123/425
[58] Field of Search ............... 123/425, 339, 416, 417, 123/406, 435, 422; 364/431.05, 431.08

[56] References Cited

U.S. PATENT DOCUMENTS

| | | | |
|---|---|---|---|
| 4,552,111 | 11/1985 | Tahara .................................. | 123/425 |
| 4,582,032 | 4/1986 | Hara et al. ........................... | 123/339 |
| 4,631,680 | 12/1986 | Korb et al. ........................... | 123/425 |
| 4,640,249 | 2/1987 | Kawamura et al. ................. | 123/425 |
| 4,655,289 | 4/1987 | Morita ................................. | 123/422 |
| 4,660,535 | 4/1987 | Asano .................................. | 123/425 |
| 4,676,212 | 6/1987 | Kashimura et al. ................. | 123/425 |

Primary Examiner—Raymond A. Nelli
Attorney, Agent, or Firm—Schwartz, Jeffery, Schwaab, Mack, Blumenthal & Evans

[57] ABSTRACT

An apparatus for controlling the timing of ignition of an internal combustion engine. The apparatus includes a cylinder pressure sensor sensitive to combustion pressure in a cylinder for providing a signal indicative of a sensed cylinder combustion pressure, and a control circuit responsive to the cylinder combustion pressure indicative signal for controlling the engine ignition timing. The control circuit measures a crankshaft angle at which the cylinder combustion pressure is at maximum. The control circuit retards the ignition timing when the measured crankshaft angle is less than a first value and advances the ignition timing when the measured crankshaft angle is greater than a second value greater than the first value. The control circuit retails the ignition timing to interrupt the feedback control of the ignition timing when the measured crankshaft angle is in a range defined by the first and second values. This is effective to eliminate a tendency toward unstable engine operation resulting from the conventional manner in which the ignition timing is re-adjusted at more frequent intervals than is required.

5 Claims, 10 Drawing Figures

ENGINE IGNITION TIMING CONTROL APPARATUS

BACKGROUND OF THE INVENTION

This invention relates to an apparatus for controlling the timing of ignition of an internal combustion engine.

In view of the fact that a maximum engine ouput torque is obtained when the engine crankshaft position $\theta_{Pmax}$ at which the cylinder pressure is at maximum is within a crankshaft angle range, for example, from about 10 degrees to about 20 degrees after top dead center, it is the conventional practice to bring the crankshaft position $\theta_{Pmax}$ to a target value by adjusting the engine ignition timing in a sense and direction to correct the sensed error between target and actual values for the crankshaft position $\theta_{Pmax}$ at which the cylinder pressure is at maximum. This is disclosed, for example, in Japanese Patent Kokai No. 58-82074.

SUMMARY OF THE INVENTION

There is provided, in accordance with the invention, an apparatus for controlling the timing of ignition of an internal combustion engine. The apparatus includes a cylinder pressure sensor sensitive to combustion pressure in a cylinder for providing a signal indicative of a sensed cylinder combustion pressure, and a control circuit responsive to the cylinder combustion pressure indicative signal for controlling the ignition timing. The control circuit includes means for measuring a crankshaft angle at which the cylinder combustion pressure is at maximum, means for retarding the ignition timing in response to the measured crankshaft angle being less than a first value, means for retaining the ignition timing in response to the measured crankshaft angle being between the first and a second value greater than the first value, and means for advancing the ignition timing in response to the measured crankshaft angle being greater than the second value.

Therefore, the invnention provides an improved engine ignition timing control apparatus which is free from a tendency toward unstable engine operation resulting from the conventional manner in which the ignition timing is re-adjusted at more frequent intervals than is required.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
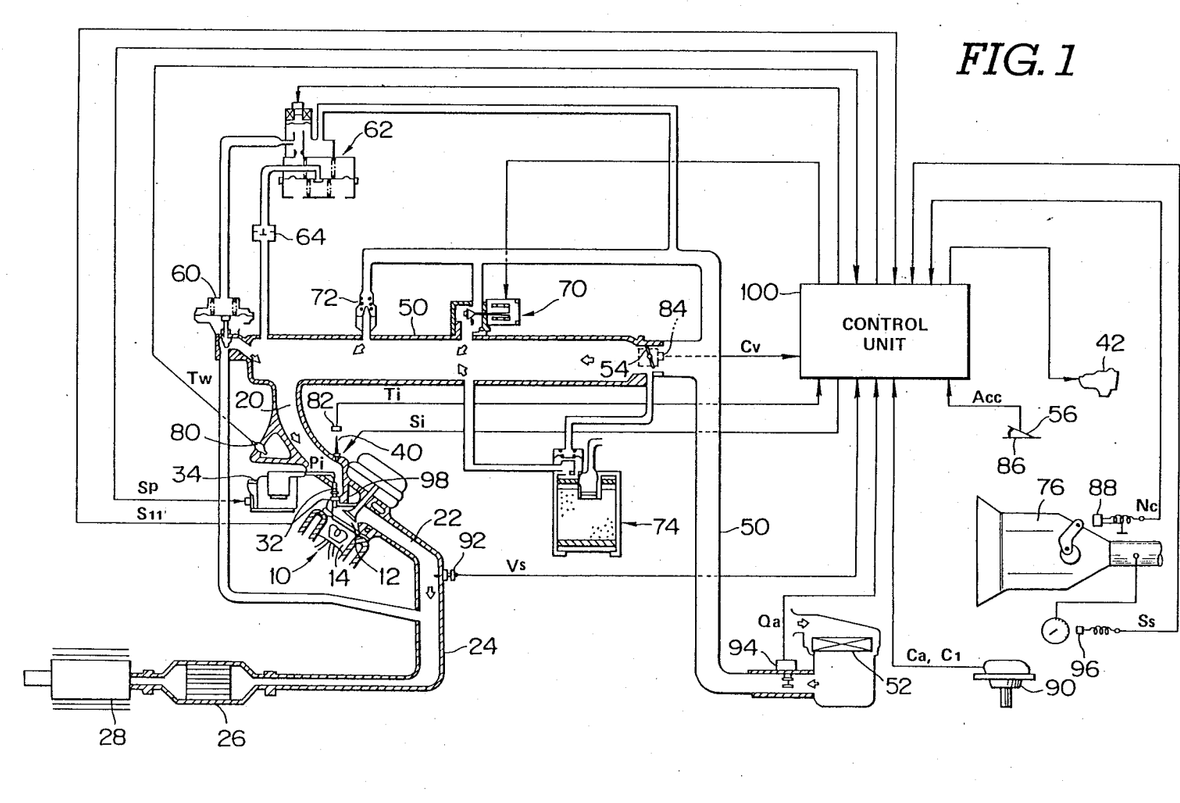
FIG. 1 is a schematic diagram of one embodiment of an engine ignition timing control apparatus made in accordance with the invention.

With reference to the drawings, wherein like numerals refer to like parts in the several views, and in particular to FIG. 1, there is shown a schematic diagram of an engine control system embodying the apparatus of the invention. An internal combustion engine, generally designated by the numeral 10, for an automotive vehicle includes a combustion chamber or cylinder 12. A piston 14 is mounted for reciprocal motion within the cylinder 12. A crankshaft (not shown) is supported for rotation within the engine 10 in response to reciprocation of the piston 14 within the cylinder 12.

An intake manifold 20 is connected with the cylinder 12 through an intake port with which an intake valve is in cooperation for regulating the entry of combustion ingredients into the cylinder 12 from the intake manifold 20. A spark plug 32 is mounted in the top of the cylinder 12 for igniting the combustion ingredients within the cylinder 12 when the spark plug 32 is energized by the presence of high voltage electrical energy Pi from an ignition coil 34. An exhaust manifold 22 is connected with the cylinder 12 through an exhaust port with which an exhaust valve is in cooperation for regulating the exit of combustion products, exhaust gases, from the cylinder 12 into the exhaust manifold 22. The intake and exhaust valves are driven through a suitable linkage with the crankshaft.

A fuel injector 40 is connected to a fuel pump 42 which is also connected to a fuel tank (not shown). The fuel pump 42 is electrically operated to maintain sufficient pressure. The fuel injector 40 opens to inject fuel into the intake manifold 12 when it is energized by the presence of electrical current Si. The length of the electrical pulse, that is, the pulsewidth, applied to the fuel injector 40 determines the length of time the fuel injector opens and, thus, determines the amount of fuel injected into the intake manifold 20. Air to the engine 10 is supplied through an air cleaner 52 into an induction passage 50. The amount of air permitted to enter the combustion chamber through the intake manifold 20 is controlled by a butterfly throttle valve 54 suitable within the induction passage 50. The throttle valve 54 is connected by a mechanical linkage to an accelerator pedal 56. The degree to which the accelerator pedal 56 is depressed controls the degree of rotation of the throttle valve 54. The accelerator pedal 54 is manually controlled by the operator of the engine control system.

In the operation of the engine 10, fuel is injected through the fuel injector 40 into the intake manifold 20 and mixes with the air therein. The engine is of the conventional four-cycle type. When the intake valve opens, the air-fuel mixture enters the combustion chamber 12. An upward stroke of the piston 14 compresses the air-fuel mixture, which is then ignited by a spark produced by the spark plug 30 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve opens and the exhaust gases are discharged into the exhaust manifold 22.

Most of the exhaust gases are discharged to the atmosphere through an exhaust system which includes an exhaust pipe 24, a catalytic converter 26 and a muffler 28. Some of the exhaust gases are recirculated to the combustion chamber 12 through an exhaust gas recirculation (EGR) system. This EGR system is constructed of the conventional parts of an EGR valve 60, a VCM valve 62 and a check valve 64. The VCM valve 62 determines the position of the EGR valve 60 and, thus, determines the amount of exhaust gases recirculated to the combustion chamber 12.

An AAC valve 70 is provided to control the amount of air introduced into the induction passage 50 through a passage bypassing the throttle valve 54 at idle conditions where the throttle valve 54 is at its closed position. The numeral 72 designates a BC valve, the numeral 74 designates a canister, and the numeral 76 designates a transmission gear unit.

Although the engine 10 as illustrated in FIG. 1 shows only one combustion chamber 12 formed by a cylinder and piston, it should be understood that the engine control system described herein is designated for use on a multi-cylinder engine. Thus, it should be understood that there are at a total of four cylinders, intake valves, exhaust valves and reciprocating pistons, four spark plugs to ignite the air-fuel mixture within the combustion chambers if it is assumed that the invention is applied to a four-cylinder engine.

Figure 2:
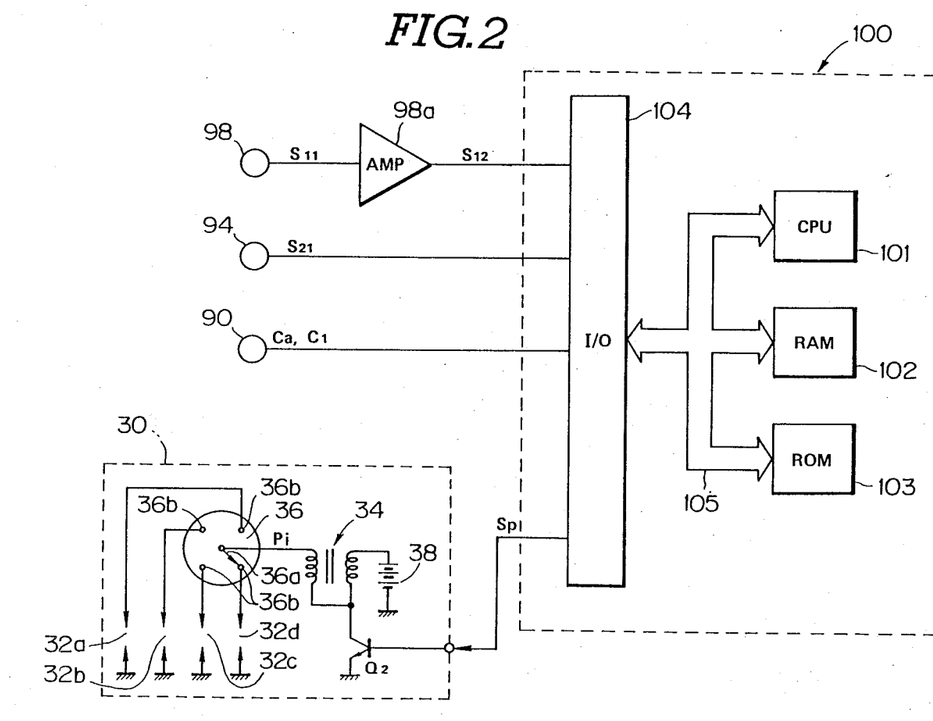
FIG. 2 is a block diagram showing a control unit used in the apparatus.

Referring to FIG. 2, the ignition system, generally designated by the numeral 30, includes a distributor 36 connected with the ignition coil 34 to energize the spark plugs 32 of the engine. For this purpose, the ignition coil 34 has a primary winding connected across a battery 38 through a transistor Q2. The ignition coil 34 has a high voltage terminal connected to a rotor 36a of the distributor 36. The rotor 36a driven at one-half the rotational velocity of the crankshaft. The distributor 36 has electrical contacts 36b each of which is connected in the usual manner by separate electrical leads to the spark plugs 32 of the engine. As the distributor rotor 36a rotates, it sequentially contacts the electrical contacts 36b to permit high voltage electrical energy to be supplied at appropriate intervals to the spark plugs 32, causing sparks to be generated across the gaps 32a, 32b, 32c and 32d of the respective spark plug 32. The distributor 36 does not control ignition-system spark-timing. Rather, spark-timing is an independently controlled variable calculated through the use of a digital computer in a manner hereinafter described.

It is to be understood that the illustrated four cylinder internal combustion engine 10 is shown and described only to facilitate a more complete understanding of the engine control system embodying the inventive apparatus.

The amount of fuel metered to the engine, this being determined by the width of the electrical pulses applied to the fuel injector 40, the fuel-injection timing, the EGR valve position, and the ignition-system spark timing are repetitively determined from calculations performed by a digital computer, these calculations being base upon various conditions of the engine that are sensed during its operation. These sensed conditions include cylinder-head coolant temperature Tw, fuel temperature Tf, throttle position Cv, accelerator pedal position Acc, transmission gear position Nc, crankshaft position Ss, exhaust oxygen content Vs, intake air flow Qa, engine speed N, and cylinder combustion pressure. Thus, a cylinder-head coolant temperature sensor 80, a fuel temperature sensor 82, a throttle position sensor 84, an accelerator-pedal position sensor 86, a transmission-gear position sensor 88, a crankshaft position sensor 90, an oxygen sensor 92, a flow meter 94, an engine speed sensor 96, and a pressure sensor 98 are connected to a control unit 100.

The cylinder-head coolant temperature sensor 80 preferably is mounted in the engine cooling system and comprises a thermistor connected in an electrical circuit capable of producing a DC voltage having a variable level proportional to coolant temperature. The fuel temperature sensor 82 preferably is a thermistor device connected in an electrical circuit capable of producing a DC voltage having a variable level proportional to fuel temperature. The throttle-valve and accelerator-pedal position sensors 84 and 86 are potentiometers electrically connected in voltage divider circuits for supplying DC voltages proportional, respectively, to throttle-valve position and EGR-valve position. The transmission-gear position sensor 88 is responsive to the position of the transmission gear in neutral for generating a voltage signal. The crankshaft position sensor 90 produces a series of crankshaft position electrical pulses C1 each corresponding to two degrees of rotation of the engine crankshaft and a series of reference electrical pulses Ca at a predetermined number of degrees, for example, 70° before the top dead center position of each engine piston. The oxygen sensor 92 monitors the oxygen content of the exhaust and is effective to provide a signal indicative of the air-fuel ratio at which the engine is operating. The flow meter 94 is responsive to the air flow through the induction passage 50 to produce a signal proportional thereto. The engine speed sensor 96 produces a signal corresponding to the speed of running of the engine. The pressure sensor 98 comprises a force ring of the piezoelectric type. The force ring, which may be firmly secured to the engine by a spark plug or a cylinder head bolt tightened to rated torque, serves as a cylinder pressure signal source. The force ring generates a charge signal corresponding to the pressure exerted on the force ring. One example of a cylinder pressure signal source suitable for use with this invention is set forth in schematic form in FIG. 3.

Figure 3:
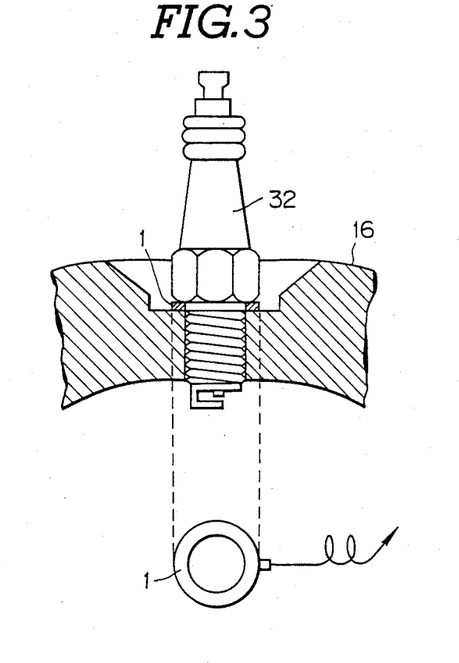
FIG. 3 shows a cylinder pressure sensor suitable for use in the apparatus.
Figure 4:
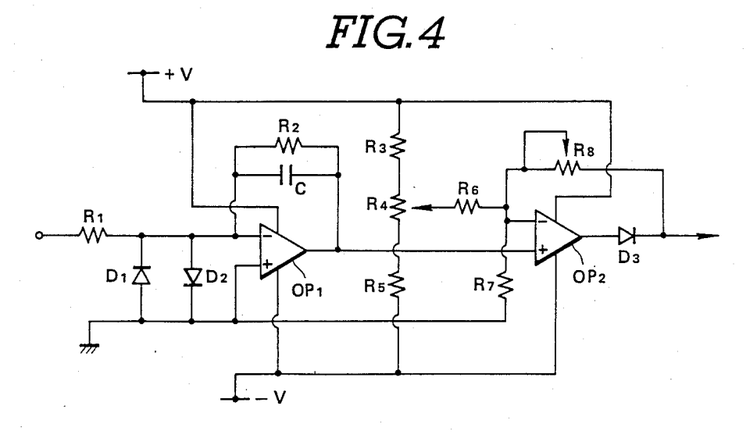
FIG. 4 is a circuit diagram of the charge amplifier circuit.

Referring to FIG. 3, the force ring, generally designated by the numeral 1, circumscribes a spark plug 32 which has a threaded portion engaged with the inward thread 18 of the cylinder head 16 of an engine cylinder 12 in a manner to tighten the force ring 1 against the cylinder head 16. During the operation of the engine, the spark plug 32 moves and vibrates due to cylinder pressure variations and engine vibrations transmitted thereto, varying the pressure exerted on the force ring 1. The force ring 1 generates a charge signal through the output electrode 3, the charge signal varying with variations in the pressure exerted on the force ring 1. Such a pressure sensor is disclosed, for example, in Japanese Patent Publication No. 1-5154. The pressure sensor 98 is connected to the control circuit 100 through a charge amplifier 98a which may be taken in the form of a charge-to-voltage converter as shown in FIG. 4. The charge amplifier receives a charge signal S11 from the pressure sensor 98 and converts the charge signal into a voltage signal S12 corresponding to the pressure produced in the cylinder 12. The voltage signal S12 is applied to the control unit 100.

The control unit 100 comprises a digital computer which includes a central processing unit (CPU) 101, a random access memory (RAM) 102, a read only memory (ROM) 103, and an input/output control circuit (I/O) 104. The CPU communicates with the rest of the cmputer via data bus 105. The input/output control circuit includes an analog-to-digital converter, a crankshaft position counter, and a spark timing control circuit. The analog-to-digital converter receives analog signals from the various sensors 80 to 98 and it converts the received signals into corresponding digital signals for application to the central processing unit 101. The A to D conversion process is initiated on command from the central processing unit 101 which selects the input channel to be converted. The crankshaft position counter counts the crankshaft position pulses C1. The read only memory 103 contains the program for operating the central processing unit 101 and further contains appropriate data in look-up tables used in calculating appropriate values for ignition-system spark timing. The look-up data may be obtained experimentally or derived empirically. The central processing unit 101 may be programmed in a known manner to interpolate between the data at different entry points if desired. Control words specifying a desired spark timing are periodically transferred by the central processing unit 101 to the spark timing control circuit which converts it into a control signal Sp to the transistor Q2 for controlling the spark timing of the ignition system 30. The digital computer is responsive to an interrupt signal to temporarily stop execution of the program control sequence (background job) and to start executing an interrupt routine for controlling the parameters during a specified operating condition.

The digital computer calculates a basic value for the timing of ignition spark events of the engine based upon engine operating parameters including intake air flow, engine speed, engine temperature, and so on. The digital computer modifies the basic value based upon the result of decision of the crankshaft angle at which the cylinder pressure is at maximum and generates a timing control signal corresponding to the modified basic value to an ignition device which thereby times the ignition spark events of the engine. The transistor Q2 is switched on and off to cause spark firing energy to be developed to fire the spark plugs of the engine in response to the timing control signal Sp.

Figure 5:
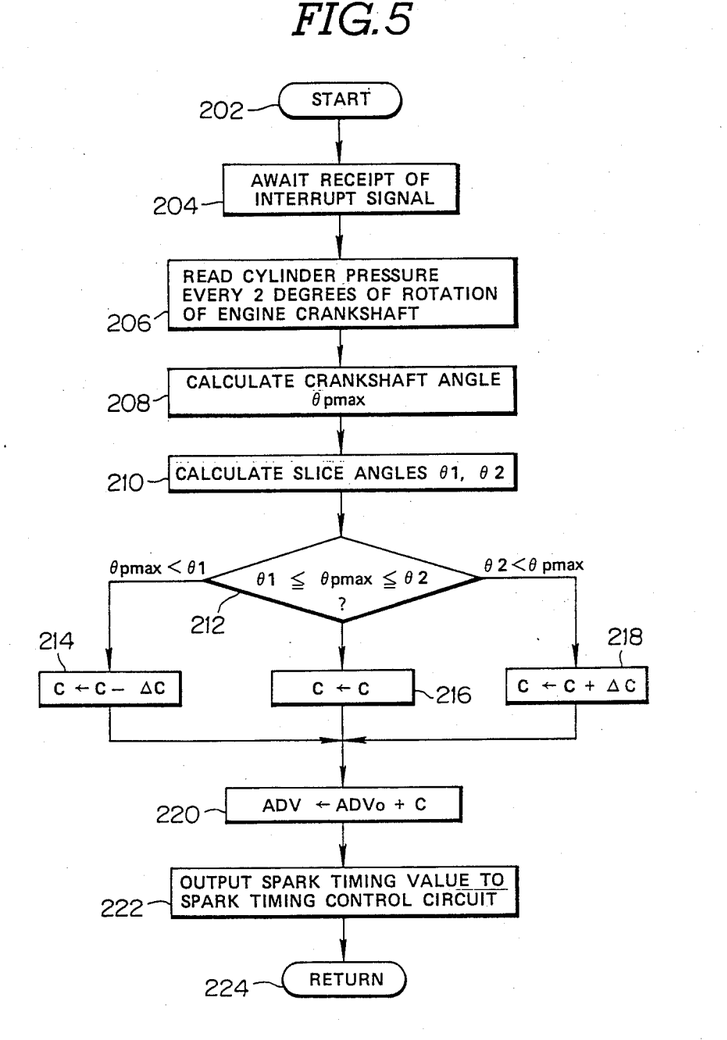
FIG. 5 is a flow diagram illustrating the programming of the digital computer.

FIG. 5 is a flow diagram illustrating the programming of the digital computer as it is used to modify the basic value for the timing of ignition spark events of the engine.

The computer program is entered at the step 202. At the step 204 in the program, the central processing unit awaits the receipt of an interrupt signal which occurs each time the crankshaft position counter, which starts counting the crankshaft position electrical pulses C1 in response to occurrence of a reference electrical pulse Ca, accumulates a predetermined count; that is, each time the engine crankshaft rotates at a predetermined number of degrees with respect to a reference position.

Figure 6:
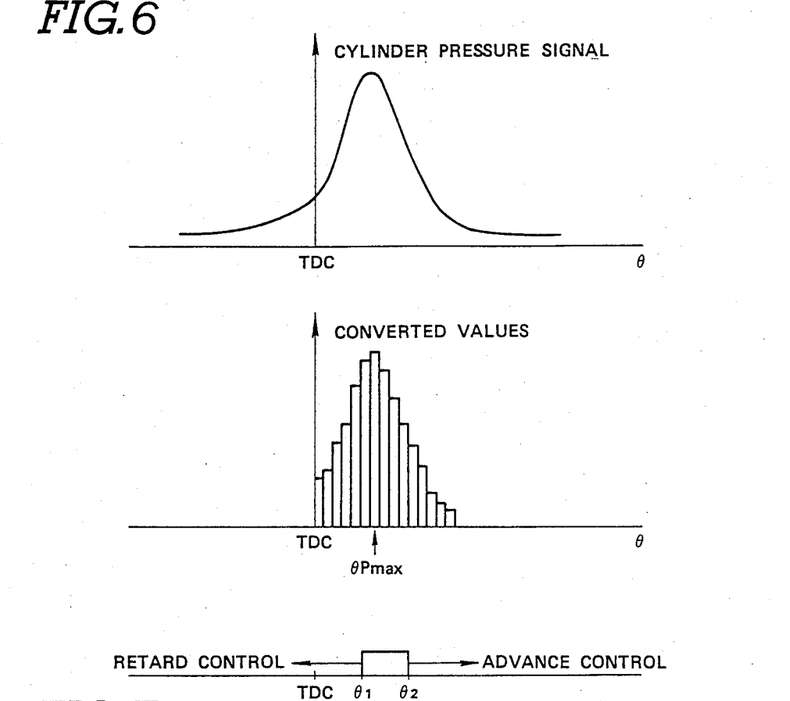
FIG. 6 contains waveforms used in explaining an A to D conversion process.

At the step 206 in the program, the central processing unit provides a command to cause the analog-to-digital converter to convert the cylinder pressure signal S12 and read it into the computer memory 103. This operation is repeated at intervals of 2 degrees of rotation of the engine crankshaft to sample a predetermined number of cylinder pressure values until the program, the central processing unit calculates a crankshaft angle $\theta_{Pmax}$ at which the cylinder pressure is at maximum, as shown in FIG. 6.

At the step 210 in the program, the central processing unit calculates upper and lower slice angle $\theta1$ and $\theta2$ which define the upper and lower limits of a target crankshaft angle range in which the crankshaft angle $\theta_{Pmax}$ at which the cylinder pressure is at maximum is to exist from a relationship programmed into the digital computer. This relationship defines upper and lower slice angles as a function of the rate of the intake air flow per one rotation of the engine crankshaft. If the crankshaft angle $\theta_{Pmax}$ at which the cylinder pressure is at maximum is within this target angle defined by the upper and lower slice angles $\theta1$ and $\theta2$, it is considered that the existing spark timing is close to a value at which a maximum engine output torque is obtained.

At the step 212 in the program, a determination is made as to whether or not the crankshaft angle $\theta_{Pmax}$ at which the cylinder pressure is at maximum is within the target range. If the crankshaft angle $\theta\theta_{Pmax}$ is less than the lower slice level 01, then the program proceeds to the step 214 where the central processing unit replaces the existing correction factor C wih a smaller value $C-\Delta C$ by subtracting a predetermined value $\Delta C$ from the existing correction factor C in order to retard the spark timing, as shown in FIG. 6. If the crankshaft angle $\theta_{Pmax}$ is within the target range, then the program proceeds to the step 216 where the central processing unit retains the existing correction factor C in order to interrupt the feedback control of the ignition-system spark timing, as shown in FIG. 6. If the crankshaft angle $\theta_{Pmax}$ is greater than the upper slice level $\theta2$, then the program proceeds to the step 218 where the central processing unit replaces the existing correction factor C with a greater value $C+\Delta C$ by adding the predetermined value $\Delta C$ to the existing correction factor C in order to advance the spark timing, as shown in FIG. 6.

Figure 7:
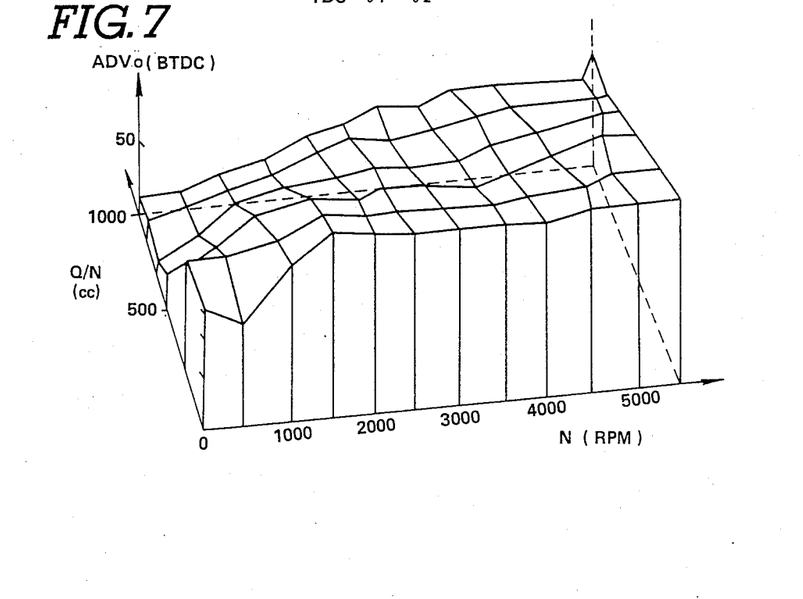
FIG. 7 is a diagram showing a look-up table used in calculating a desired value for ignition-system spark timing.

At the step 220 in the program, the central processing unit calculates a value ADV for ignition-system spark timing by adding the modified correction factor C to the basic value ADVo for ignition-system spark timing. The basic value ADVo is calculated by the digital computer central processing unit during execution of another program from a relationship programmed into the digital computer. This relationship is shown in FIG. 7 and defines spark timing basic value ADVo as a function of the rate (Q/N) of the intake air flow per one rotation of the engine crankshaft and engine speed N. At the step 222 in the program, the calculated value ADV for ignition-system spark timing is outputted to the spark timing control circuit. The spark-timing control circuit sets the spark-timing by producing pulses to the transistor Q2 to cause an ignition spark to be produced at the time calculated by the computer. At the step 224 in the program, the computer program returns to the entry point 202 to await receipt of the next interrupt signal.

Figure 8:
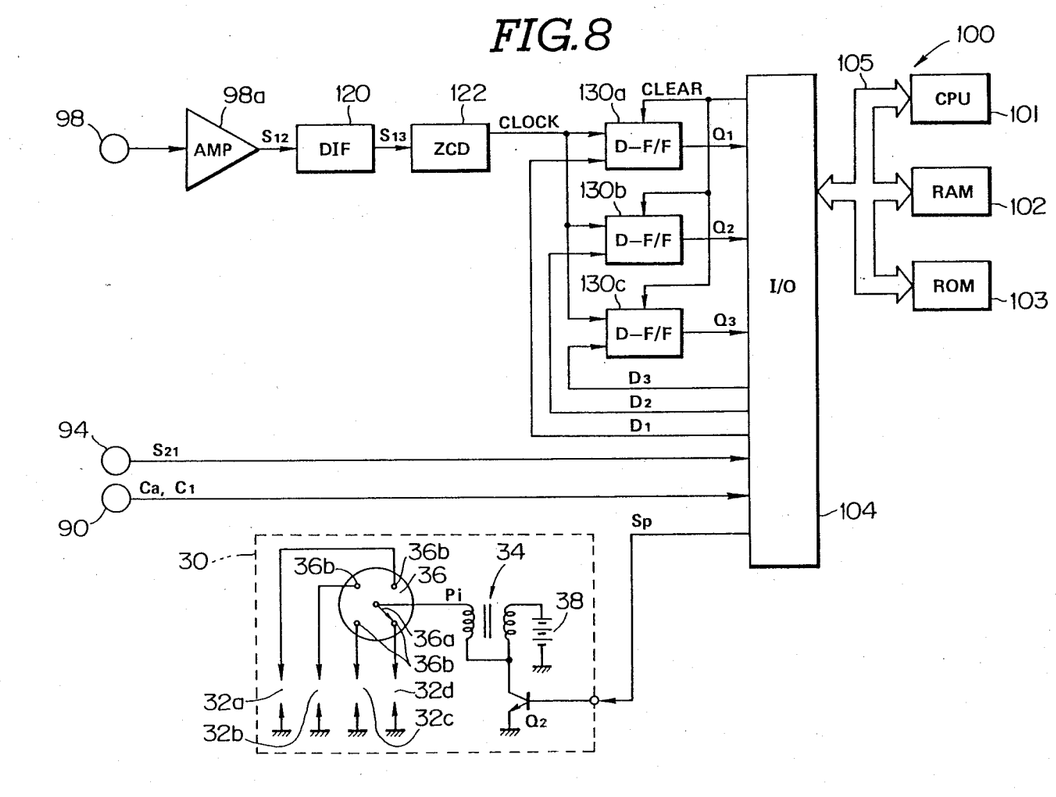
FIG. 8 is a block diagram showing another embodiment of the invention.

Referring to 8, there is illustrated another embodiment of the invention which can eliminate the need for a high-speed analog-to-digital converter required in the first embodiment in converting the cyliner pressure signal S12 at very small intervals of two degrees of rotation of the engine crankshaft.

Figure 9:
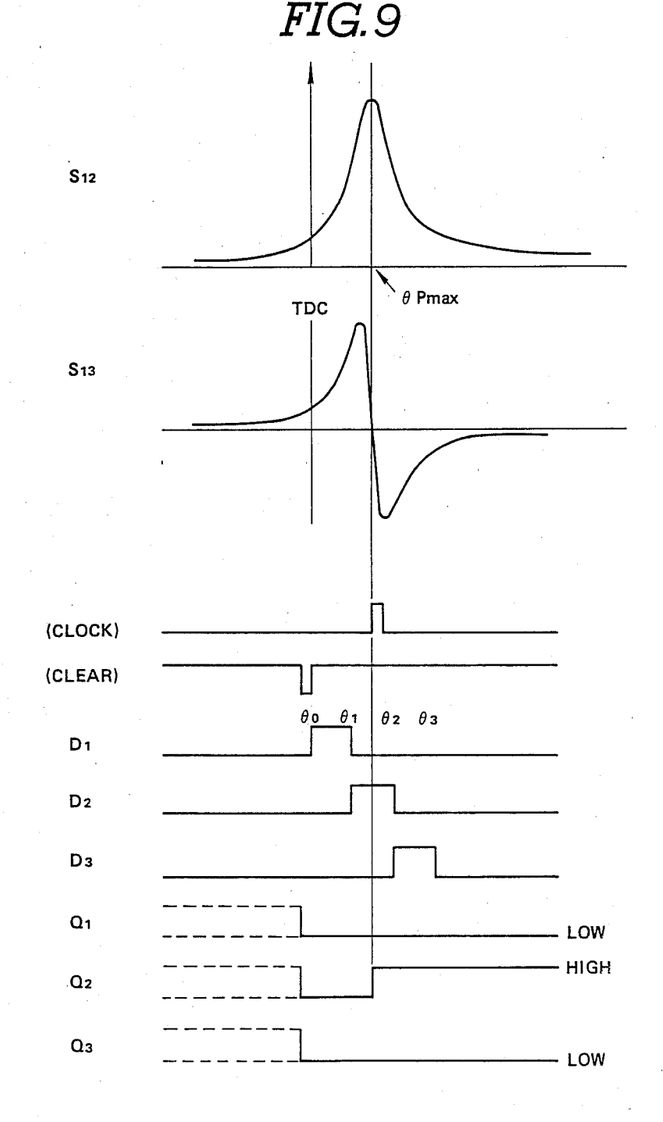
FIG. 9 contains waveforms used in explaining the operation of the control unit.

In this embodiment, the cylinder pressure signal S12, as shown in FIG. 9, is applied from the charge amplifier 98a to a differentiation circuit 120 which differentiates it. As shown in FIG. 9, the differentiated signal S13 crosses zero when the cylinder pressure signal S12 is at maximum. The differentiated signal S13 is applied to a zero crossing detection circuit 122. The zero crossing detection circuit 122 generates a clock pulse when the differentiated signal S13 crosses zero, as shown in FIG. 9. The clock pulse is applied to three D-type flip-flop circuits 130a, 130b, and 130c.

Data signals D1, D2 and D3 are applied at appropriate times from the control circuit 100 to the respective flip-flop circuits 130a, 130b and 130c. The data signal D1 changes to its high level when the engine crankshaft angle $\theta$ reaches a predetermined value $\theta o$ less than the lower slice value $\theta 1$ and changes to its low level when the engine crankshaft angle reaches the lower slice value $\theta 1$. That is, the data signal D1 remains high when the engine crankshaft angle is in the first range from the value $\theta o$ to the value $\theta 1$. The data signal D2 changes to its high level when the engine crankshaft angle $\theta$ reaches the lower slice value $\theta 1$ and changes to its low level when the engine crankshaft angle reaches the upper slice value $\theta 2$. That is, the data signal D2 remains high when the engine crankshaft angle is in the second range from the value $\theta 1$ to the value $\theta 2$. The data signal D3 changes to its high level when the engine crankshaft angle $\theta$ reaches the upper slice value $\theta 2$ and changes to its low level when the engine crankshaft angle reaches a predetermined value $\theta 3$ greater than the upper slice value $\theta 2$. That is, the data signal D3 remains high when the engine crankshaft angle is in the third range from the upper slice value $\theta 2$ to the value $\theta 3$.

The flip-flop circuit 130a changes its output Q1 to a high level in response to a clock pulse from the zero crossing detection circuit 122 when the data signal D1 is at its high level. Similarly, the flip-flop circuit 130b changes its output Q2 to a high level in response to a clock pulse from the zero crossing detection circuit 122 when the data signal D2 is at its high level. The flip-flop circuit 130c changes its output Q3 to a high level in response to a clock pulse from the zero crossing detection circuit 122 when the data signal D3 is at its high level. The flip-flop circuit s130a, 130b and 130c changes their respective outputs Q1, Q2 and Q3 to the low level in response to a clear pulse from the control circuit 100. The outputs Q1, Q2 and Q3 of the respective flip-flop circuits 130a, 130b and 130c are applied to the control unit 100.

The control unit 100 determines which one of the outputs Q1, Q2 and Q3 of the flip-flop circuits 130a, 130b and 130c is at the high leel in order to determine which one of the crankshaft angle ranges the crankshaft angle $\theta_{Pmax}$ at which the cylinder pressure is at maximum xists. If the output Q1 is high, it means that the crankshaft angle $\theta_{Pmax}$ is in the first crankshaft angle range between the values $\theta o$ and $\theta 1$ and the control unit 100 decreases the existing correction factor C in order to retard the spark timing. If the output Q2 is high, it means that the crankshaft angle $\theta_{Pmax}$ is in the second crankshaft angle range between the values $\theta 1$ and $\theta 2$ and the control unit 100 retains the existing correction factor C in order to interrupt the feedback control of the spark timing. If the output Q3 is high, it means that the crankshaft angle $\theta_{Pmax}$ is in the third crankshaft angle range between the values $\theta 2$ and $\theta 3$ and the control unit 100 increases the existing correction factor C in order to advance the spark timing.

Figure 10:
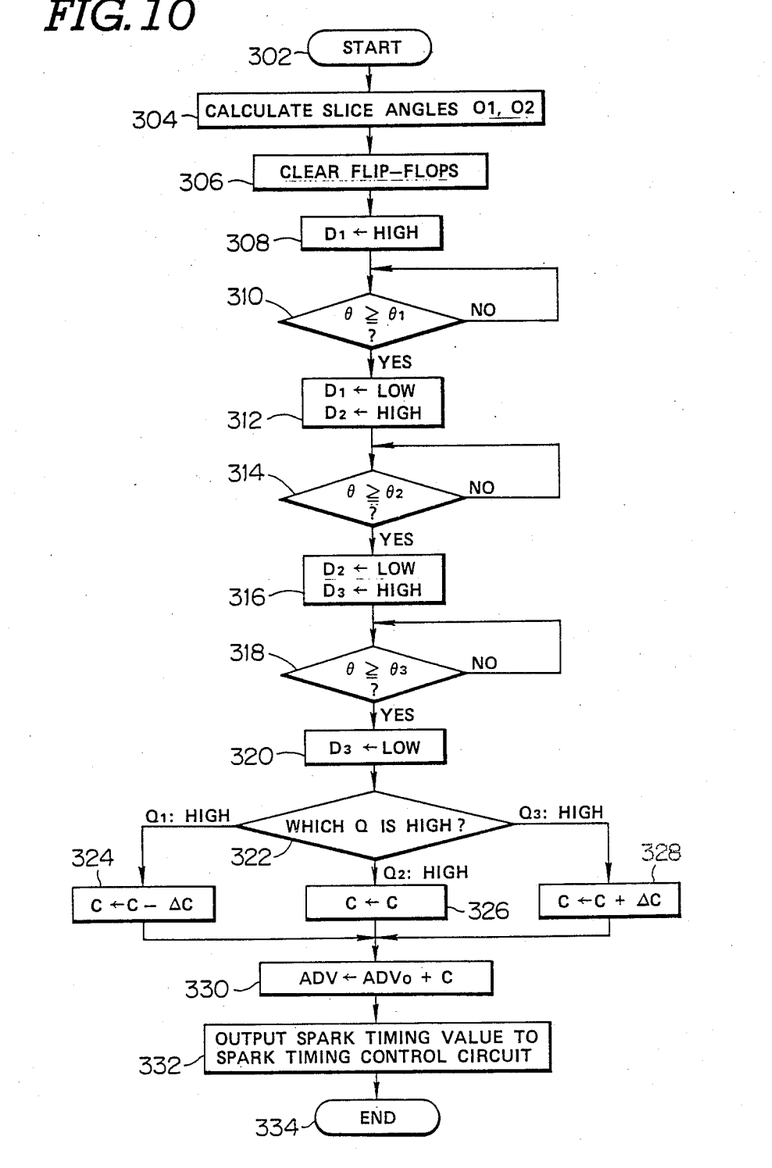
FIG. 10 is a flow diagram illustrating the programming of the digital computer of FIG. 8.

FIG. 10 is a flow diagram illustrating the programming of the digital computer as it is used to modify the basic value for the timing of ignition spark events of the engine.

The computer program is a flow diagram illustrating the programming of the digital computer as it is used to modify the basic value for the timing of ignition spark events of the engine.

The computer program is entered at the step 302 when the crankshaft position counter, which start counting crankshaft position electrical pulses C1 in response to a reference electrical pulse Ca, accumulates a predetermined count corresponding to the engine crankshaft angle $\theta o$.

At the step 34 in the program, the central processing unit calculates upper and lower slice angles $\theta 1$ and $\theta 2$ from a relationship programmed into the digital computer. This relationship defines upper and lower slice angles as a function of the rate of the intake air flow per one rotation of the engine crankshaft. At the following step 306 in the program, a clear pulse is outputted to the respective flip-flop circuits 130a, 130b and 130c to change their outputs Q1, Q2 and Q3 to the low level. At the step 308 in the program, the data signal D1 is changed to its high level.

At the step 310 in the program, a determination is made as to whether or not the crankshaft angle $\theta$ is equal to or greater than the value $\theta 1$. If the answer to this question is "no", then it means that the crankshaft angle is in the first range from the value $\theta o$ to the value $\theta 1$ and the program returns to the step 310. This operation is repeated until the crankshaft angle reaches the lower slice value $\theta 1$. If the crankshaft angle reaches the lower slice value $\theta 1$, then the program proceeds to the tep 12 where the data signal D1 is changed to its low level and the data signal D2 is changed to its high level.

At the step 314 in the program, a determination is made as to whether or not the crankshaft angle $\theta$ is equal to or greater than the upper slice value $\theta 2$. If the answer to this question is "no", then it means that the crankshaft angle is in the second angle from the value $\theta 1$ to the value $\theta 2$ and the program returns to the step 314. This operation is repeated until the crankshaft angle reaches the upper slice value $\theta 2$. If the crankshaft angle reaches the upper slice value $\theta 2$, then the program proceeds to the step 316 where the data signal D2 is changed to its low level and the data signal D3 is changed to its high level.

At the step 318 in the program, a determination is made as to whether or not the crankshaft angle $\theta$ is equal to or greater than the value $\theta 3$. If the answer to this question is "no", then it means that the crankshaft angle is in the third range from the value $\theta 2$ to the $\theta 3$ and the program returns to the step 318. This operation is repeated until the crankshaft angle reaches the value $\theta 3$. If the crankshaft angle reaches the value $\theta 3$, then the program proceeds to the step 320 where the data signal D3 is changed to its low level.

At the step 322 in the program, a determination is made as to which one of the flip-flop outputs Q1, Q2 and Q3 is high. If the flip-flop output Q1 is high, then it means that the crankshaft angle $\theta_{Pmax}$ at which the cylinder pressure is at maximum is in the first range less than the lower slice value $\theta 1$ and the program proceeds to the step 324 where the central processing unit replaces the existing correction factor C with a smaller value $C - \Delta C$ by subtracting a predetermined value $\Delta C$ from the existing correction factor in order to retard the spark timing. If the flip-flop output Q2 is high, then it means that the crankshaft angle $\theta_{Pmax}$ is in the second range between the lower and upper slice angles $\theta 1$ and $\theta 2$ and the program proceeds to the step 326 where the central processing unit retains the existing correction factor C in order to interrupt the feedback control of the ignition-system spark timing. If the flip-flop output Q3 is high, then it means that the crankshaft angle $\theta_{Pmax}$ is in the third range greater than the upper slice angle $\theta2$ and the program proceeds to the step 328 where the central processing unit replaces the existing correction factor C with a greater value $C+\Delta C$ by adding the predetermined value $\Delta C$ to the existing correction factor C in order to advance the spark timing.

At the step 330 in the program, the central processing unit calculates a value ADV for ignition-system spark timing by adding the modified correction factor C to the basic value $ADV_o$ for ignition-system spark timing. The basic value $ADV_o$ is calculated by the digital computer central processing unit during execution of another programk from a relationship programmed into the digital computer as described previous. At the step 332 in the program, the calculated value ADV for ignition-system spark timing is outputted to the spark timing control circuit. The spark-timing control circuit sets the spark-timing by producing pulses to the transistor Q2 to cause an ignition spark to be produced at the time calculated by the computer. Folowing this, the program proceeds to the end step 334.

According to this invention, the ignition timing is retained in order to interrupt the feedback control of the engine ignition timing when the crankshaft angle $\theta_{Pmax}$ at which the cylinder pressure is at maximum is in a range. This is effective to eliminate the tendency for unstable engine operation resulting from the conventional manner in which the ignition timing is re-adjusted at more frequent intervals than is required.

What is claimed is:

1. An apparatus for controlling the timing of ignition of an internal combustion engine including at least one cylinder, comprising:
   sensor means sensitive to combustion pressure in said cylinder for providing a sensor signal indicative of a sensed cylinder combustion pressure; and
   a control circuit including means coupled to said sensor means for measuring a crankshaft angle at which the cylinder combustion pressure is at maximum, means for retarding the ignition timing in response to the measured crankshaft angle being less than a first value, means for retaining the ignition timing in response to the measured crankshaft angle being between the first and a second value greater than the first value, and means for advancing the ignition timing in response to the measured crankshaft angle being greater than the second value.

2. The apparatus as claimed in claim 1, wherein said control circuit includes means for calculating the first and second values in accordance with engine operating conditions.

3. The apparatus as claimed in claim 2, wherein said control circuit includes means for calculating a value for ignition timing in accordance with engine operating conditions, means for comparing said measured crankshaft angle with the first and second values, means for decreasing the calculated ignition timing value by a predetermined value when the measured crankshaft angle is less than the first value, means for retaining the calculated ignition timing value when the measured crankshaft angle is between the first and second values, and means for decreasing the calculated ignition timing value by the predetermined value.

4. The apparatus as claimed in claim 1, wherein said control circuit including means (122) for producing a pulse when said measured crankshaft position is at maximum, means for producing a first signal (D1) when said engine crankshaft is in a first range from a third value less than the first value to the first value, means for producing a second signal (D2) when said engine crankshaft is in a second range from the first value to the second value, means for producing a third signal (D3) when said engine crankshaft is in a third range from the second value to a fourth value greater than the second value, means (130a) for producing a fourth signal upon simultaneous occurrence of the pulse and the first signal, means (130b) for producing a fifth signal upon simultaneous occurence of the pulse and the second signal, means (130c) for producing a sixth signal upon simultaneous occurrence of the pulse and the third signal, means responsive to the fourth signal for retarding the ignition timing, means responsive to the fifth signal for retaining the ignition timing, and means responsive to the sixth signal for advancing the ignition timing.

5. The apparatus as claimed in claim 4, wherein said means for producing a pulse includes a differentiation circuit (120) for differentiating the sensor signal to produce a differentiated signal and means (122) for producing the pulse in response to the differentiated signal crossing zero.

* * * * *